W. H. HOEFELMAN.
Improvement in Plow-Colters.
No. 130,638.  Patented Aug 20, 1872.
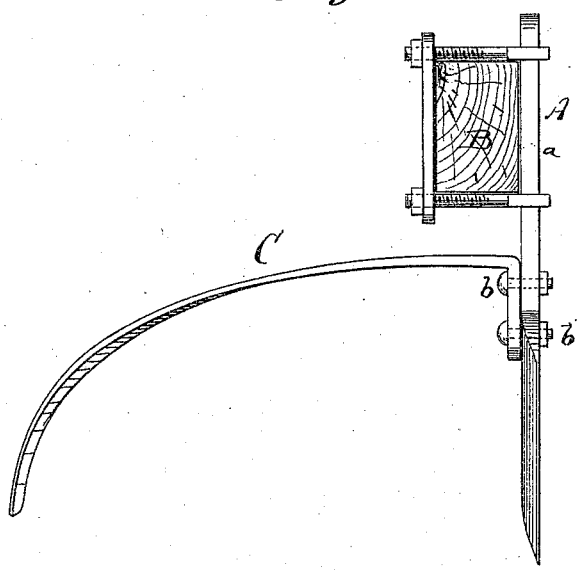
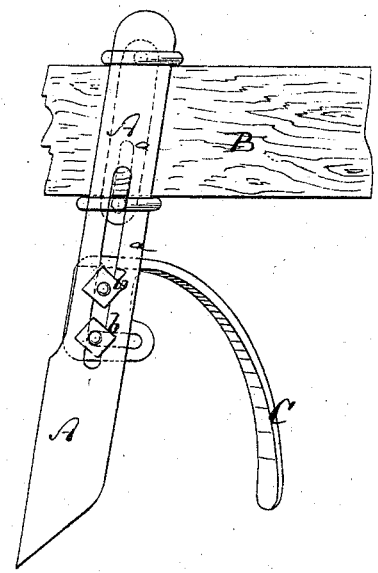
Witnesses:
A. W. Almqvist
N. A. Graham
Inventor:
W. H. Hoefelman.
per
Attorneys.

UNITED STATES PATENT OFFICE.

WILLIAM H. HOEFELMAN, OF COLUMBUS, NEBRASKA.

IMPROVEMENT IN PLOW-COLTERS.

Specification forming part of Letters Patent No. 130,638, dated August 20, 1872.

Specification describing a new and Improved Cornstalk and Weed Burier, invented by WILLIAM H. HOEFELMAN, of Columbus, in the county of Platte and State of Nebraska.

Figure 1 is a front view, and Fig. 2 a side view of my improved cornstalk and weed-burier.

Similar letters of reference indicate corresponding parts.

This invention relates to a new plow attachment for causing weeds, stalks, and stubble, to be covered by the plow while the same is turning the soil, with the object of removing such stalks, &c., from the way of harvesting-machines, which they frequently clog, and of utilizing the same to enrich the soil. The invention consists in the use of a colter applied to the plow-beam, and combined with a laterally-projecting curved arm for turning the weeds, &c., which have been detached by the colter.

A in the drawing represents the colter provided with a slotted shank, $a$, and attached vertically adjustable to the plow-beam B, directly in front of the plow-point. C is a curved arm fastened by means of bolts or pins $b\ b$ to the side of the colter, and projecting toward the ground in front of the mold-board. It serves to carry all weeds, &c., that have been cut off their connections by the colter into position to be covered by the soil as the same is turned over by the mold-board. The shank of the curved arm C is slotted, as shown, to make it adjustable on the colter back and forward.

Having thus described my invention, I claim as new and desire to secure by Letters Patent—

The vertically-adjustable colter A, in combination with the curved arm C, substantially as herein shown and described.

WILLIAM H. HOEFELMAN.

Witnesses:
 JOSEPH SCHLÖSSER,
 V. KUMMER.